US012023556B2

(12) United States Patent
Dao et al.

(10) Patent No.: US 12,023,556 B2
(45) Date of Patent: Jul. 2, 2024

(54) TENNIS BALL PICKUP ASSEMBLY AND RELATED METHODS

(71) Applicants: Nicholas T. Dao, Irvine, CA (US); Alexander T. Dao, Irvine, CA (US); Tom H. Dao, Irvine, CA (US)

(72) Inventors: Nicholas T. Dao, Irvine, CA (US); Alexander T. Dao, Irvine, CA (US); Tom H. Dao, Irvine, CA (US)

( * ) Notice: Subject to any disclaimer, the term of this patent is extended or adjusted under 35 U.S.C. 154(b) by 331 days.

(21) Appl. No.: 17/368,348

(22) Filed: Jul. 6, 2021

(65) Prior Publication Data

US 2022/0001247 A1 Jan. 6, 2022

Related U.S. Application Data

(60) Provisional application No. 63/066,735, filed on Aug. 17, 2020, provisional application No. 63/048,507, filed on Jul. 6, 2020.

(51) Int. Cl.
*A63B 47/02* (2006.01)
*A63B 102/02* (2015.01)
*F21V 33/00* (2006.01)

(52) U.S. Cl.
CPC ............ *A63B 47/02* (2013.01); *F21V 33/008* (2013.01); *A63B 2102/02* (2015.10); *A63B 2225/74* (2020.08)

(58) Field of Classification Search
CPC .... A63B 47/02; A63B 2225/74; F21V 33/008
See application file for complete search history.

(56) References Cited

U.S. PATENT DOCUMENTS

| | | | | |
|---|---|---|---|---|
| 4,231,077 A * | 10/1980 | Joyce | F21L 4/005 362/558 |
| 5,370,387 A * | 12/1994 | Baker | A63B 47/02 294/19.2 |
| 5,466,027 A * | 11/1995 | Hockey | A63B 47/02 294/19.2 |
| 2011/0049919 A1* | 3/2011 | Ballard | A63B 47/02 294/19.2 |
| 2011/0062731 A1* | 3/2011 | Milikovsky | A63B 47/02 294/19.2 |
| 2014/0306471 A1* | 10/2014 | Vital, Jr. | A63B 47/02 294/19.2 |
| 2015/0273283 A1* | 10/2015 | Davis | A63B 47/02 294/19.2 |
| 2016/0303434 A1* | 10/2016 | Wong | A63B 47/02 |

* cited by examiner

*Primary Examiner* — Alexander K Garlen
(74) *Attorney, Agent, or Firm* — Alumen IP Law PC

(57) ABSTRACT

A tennis ball pickup assembly having tube with a pickup gate device attached to a first end of the tube and a protective sleeve attached to a second end of the tube. The tube is sized and shaped to accept tennis balls. The body of the pickup gate device has a wall with a first end, a second end, and a hollow interior; and wherein a gate is located in a holding space of the hollow interior. The gate has a spring ring with a plurality of interconnected metallic coils, a metal wire, or a plurality of metallic leaf springs.

19 Claims, 9 Drawing Sheets

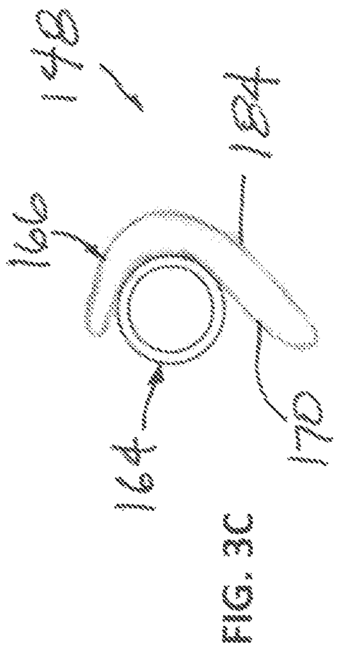
FIG. 3C
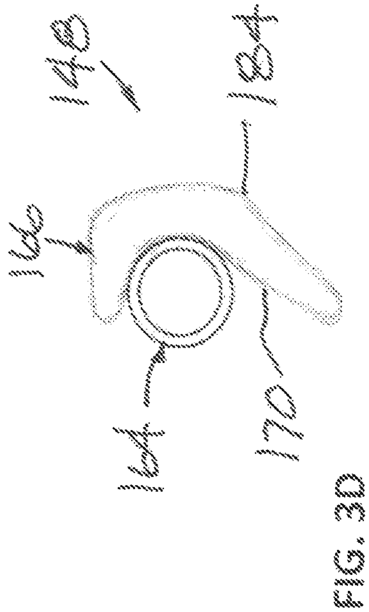
FIG. 3D
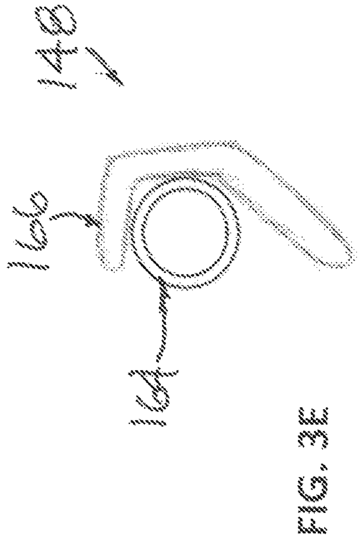
FIG. 3E
FIG. 3B
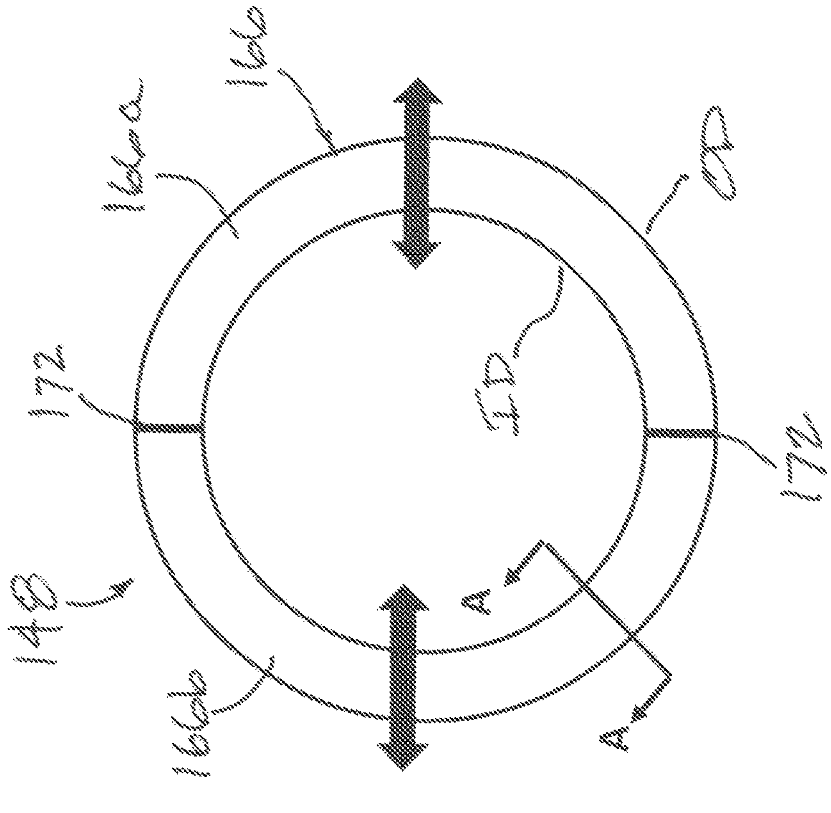

TENNIS BALL PICKUP ASSEMBLY AND RELATED METHODS

FIELD OF ART

The present disclosure is generally related to a tennis ball pickup assembly and related methods and specifically to tennis ball pickup tubes with pickup ends having a biased member.

BACKGROUND

Tennis players love to hit tennis balls but very few players enjoy picking up tennis balls from the tennis court after they practice. This is especially true when players take up lessons and dozens if not hundreds of tennis balls are used by the tennis coaches for training. It is always a low point of tennis practices.

To aid in in the process, various gadgets have developed to help players pick up tennis balls. These gadgets include tennis ball hoppers, tennis ball mowers, tennis ball rollers, and tennis ball pickup tubes. These devices range in their effectiveness and price range and generally work as advertised.

SUMMARY

A tennis ball pickup assembly is disclosed. The pickup assembly has a pickup end that has a gate with a metallic spring ring. The metallic spring ring has components or parts that can expand and contract to let tennis balls pass therethrough. At the same time, the spring ring resists reverse flow of tennis balls pouring from the interior of the tube out through the same gate. Using metallic spring rings allow the tennis ball pickup assembly to operate over a much longer actuation cycle so that tennis balls can be picked up using the pickup assembly without slipping back out through the same gate opening.

Aspects of the invention can include a tennis ball pickup assembly comprising a pickup gate device comprising a body having a wall with a first end, a second end, and a hollow interior; and wherein a gate is located in a holding space of the hollow interior, the gate comprising a spring ring comprising a plurality of interconnected metallic coils or a plurality of metallic leaf springs.

A tube can comprise a tube body with a first end and a second end can attach to the pickup gate device at the first end of the tube body.

A support sleeve can attach to the second end of the tube body. The support sleeve can have a hollow body with an ID that is larger than the tennis ball OD so that the tennis ball can be pour from the interior of the tube body and out through the support sleeve to dispense tennis balls from the tube.

A push ring can comprise a concave surface and a convex surface can be placed in the holding space of the pickup gate device. The spring ring can contact the concave surface of the push ring.

The spring ring can be made from a metal material, such as from a metal wire to form a plurality of interconnected coils or from stamping a plurality of cut-outs to form leaf springs.

The push ring can be molded from a hard plastic. The push ring can be made from a plurality of push ring sections. Each push ring section can have two free ends at opposed end of the push ring body. One of the free ends can define a bottom opening of the gate of the pickup up gate device.

In alternative embodiments, the push ring, such as the push ring sections, can be made from a metal material.

The push ring can comprise a plurality of push ring sections that contact one another along split lines.

The plurality of push ring sections can define an inside diameter (ID) having a first state with a first dimension.

The ID of the push ring can have a second state with a second dimension larger than the first dimension when a tennis ball passes through the ID of the push ring.

The tube body can have an ID that is sized and shaped to accommodate at least two tennis balls across a horizontal or radial dimension.

A further aspect of the invention can include a method of making a tennis ball pickup assembly comprising placing a gate into a holding space of a body of a pickup gate device, the body comprising a wall with a first end, a second end, and a hollow interior; and wherein the gate comprises a spring ring comprising a plurality of interconnected metallic coils or a plurality of metallic leaf springs.

A still yet further aspect of the invention includes a method of using a tennis ball pickup assembly comprising: placing a first end of a tube over a tennis ball so that a bottom opening of a pickup gate device comprising a gate is located over the tennis ball; and pushing the tube against the ball so that an inside diameter (ID) of a spring ring comprising a plurality of interconnected metallic coils or a plurality of metallic leaf springs increases from a first inside diameter to a second inside diameter, which is larger than the first inside diameter.

A still yet further aspect of the invention includes a pickup gate device for a tennis ball pickup assembly comprising a body comprising a wall with a first end and a second end, the wall of the body defining an interior having a gate located therein, wherein the gate comprises a spring ring comprising a plurality of interconnected metallic coils or a plurality of metallic leaf springs.

Methods of making and of using the pickup assembly and components thereof are within the scope of the invention.

BRIEF DESCRIPTION OF THE DRAWINGS

These and other features and advantages of the present devices, systems, and methods will become appreciated as the same becomes better understood with reference to the specification, claims and appended drawings wherein:

FIG. 3B is a top view of the gate of FIG. 3A.

FIGS. 3C-3E are end cross-sectional views of alternative gates.

DETAILED DESCRIPTION

The detailed description set forth below in connection with the appended drawings is intended as a description of the presently preferred embodiments of a tennis ball pickup assembly, components thereof, and related methods provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1A:
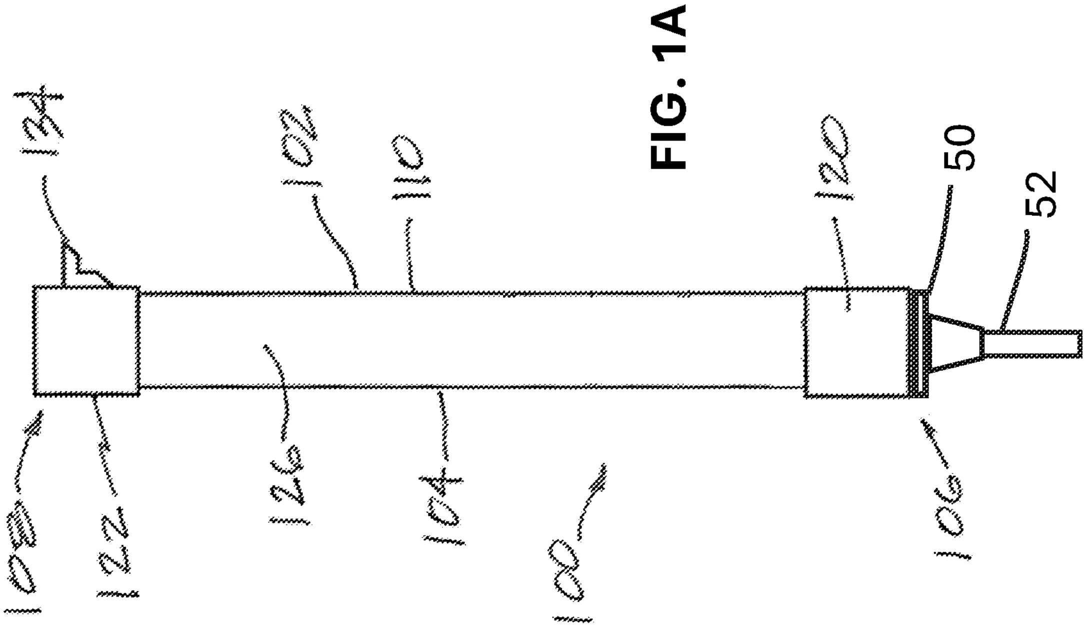
FIG. 1 is a schematic side view of tennis ball pickup assembly and FIG. 1A shows the ball pickup assembly with an attachment device and a light source.
Figure 1:
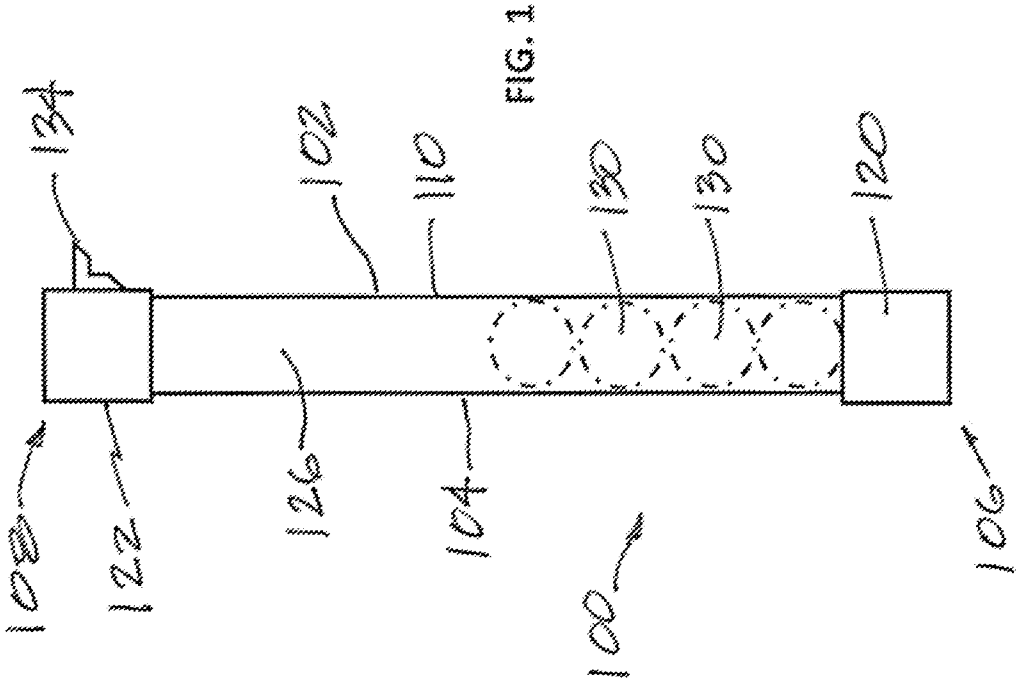

With reference now to FIG. 1, a schematic side view of a tennis ball pickup assembly 100 provided in accordance with aspects of the invention is shown. The tennis ball pickup assembly 100, or pickup assembly 100 for short, comprises a tube 102 having a tube body 104 with a first end 106 and a second end 108. The tube body 104 can be cylindrical and hollow. In an example, the tube 102 is made from a plastic material, is approximately 47-inches long, and has a tube ID that is sized and shaped to accept a plurality of tennis balls that are stacked on top of one another. In other examples, the tube length and the tube ID can have different sizes. The length of the tube can define a lengthwise axis of the pickup assembly.

The tube body 104 can be opaque and be colored, such as having a blue, yellow, orange, or red color exterior finish with other colors contemplated. The tube body 104 can be formed by plastic extrusion, using PVC, ABS, HIPS, HDPE, TPU, and TPE, among others. Optionally, pictures, texts, or other indicia can be printed on the exterior 110 of the tube body 104. The length of the tube body can hold approximately 20 tennis balls. In other examples, the length can be longer or shorter than 47-inches and can hold more or less than 20 tennis balls. In still other examples, the tube body can be made from a transparent plastic material, such as from acrylic, ABS, Lexan, or polycarbonate, to name a few non-limited examples.

A pickup gate device 120 is shown slipped over the first end 106 of the tube body 104 and an optional support sleeve 122 is shown slipped over the second end 108 of the tube body. In use, only the pickup gate device 120 is required at the first end while the support sleeve 122, while preferred, is optional since the tube assembly 100 is operational without it. Broadly speaking, the pickup gate device 120 is configured to accept one or more tennis balls 130 when the first end 106 of the tube assembly 100 is placed over and pressed against the tennis balls 130, serially or one at a time. When subsequent tennis balls 130 are picked up through the pickup gate device 120 at the first end 106, the earlier picked up tennis balls are pushed up by the latest or last picked up ball and move up through the hollow interior 126 as a single-file stack. As the tennis balls 130 enter the hollow interior through the pickup date device 120, the tennis balls 130 are prevented from escaping out through the same first end 106 due to gravity.

The pickup assembly 100 can be used to pick up tennis balls 130 until the tube body is full. Depending on the length of the tube body 104, there can be 15 to 22 tennis balls, or fewer or more tennis balls depending on the size of the tube 102, stacked inside the tube body 104 when full. At that point, or sooner if the user does not wish to wait until the tube body 104 is full, the user can then dispense all of the collected tennis balls 130 out through the support sleeve 122 at the second end 108 of the tube, such as by tilting the tube so that the balls flow or travel out of from the interior of the tube.

In an example, the support sleeve 122 is a hollow cylinder having an inside diameter ID that is sized and shaped to allow tennis balls to pass therethrough. The ID of the support sleeve 122 can slip over the second end 108 of the tube body 104 and can engage the second end of the tube body in an interference fit. Optionally, adhesive, glue, detents, fasteners, or combinations thereof can be used to more permanently secure the support sleeve 122 over the exterior of the second end 108. The support sleeve 122, which can be made from a high durometer rubber material or a hard plastic, reinforces the second end 108 of the tube body. In some examples, an appendage 134, such as a hook, can be provided on a side of the support sleeve 122 to allow the tube assembly 100 to hook against the fence via the appendage. The appendage can also be used lean against a ledge or a wall. In some examples, there can be more than one appendage incorporated with the support sleeve 122. In still other examples, one or more appendages 134 can be incorporated on the exterior of the pickup gate device 120.

Figure 2A:
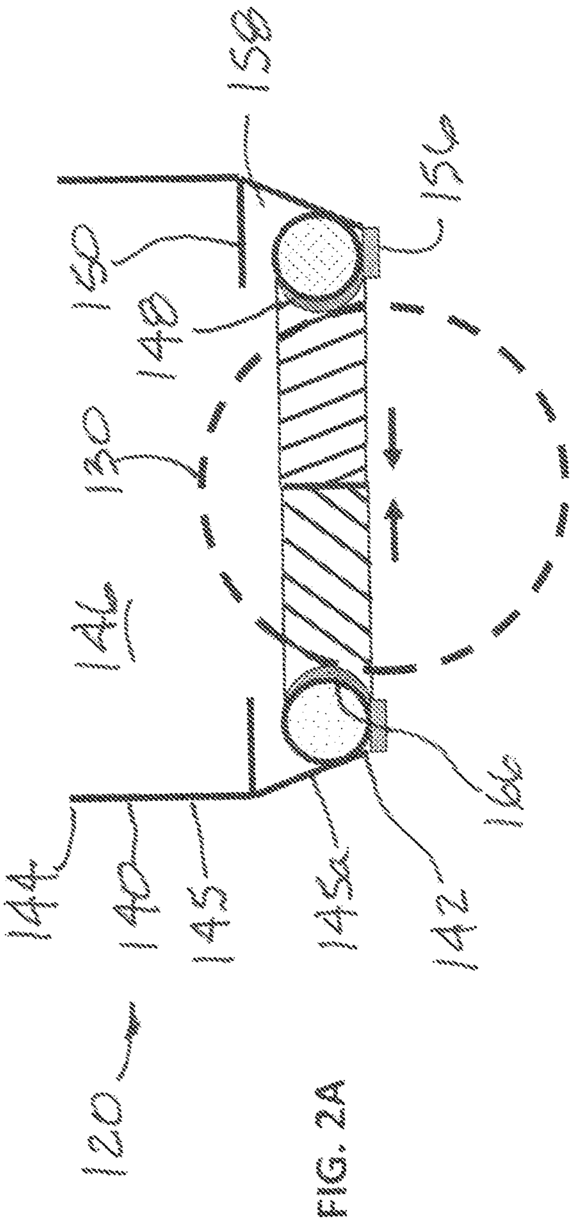
FIGS. 2A and 2B are schematic side views showing two different states of a pickup gate device usable at the first end of the pickup assembly of FIG. 1.
Figure 2B:
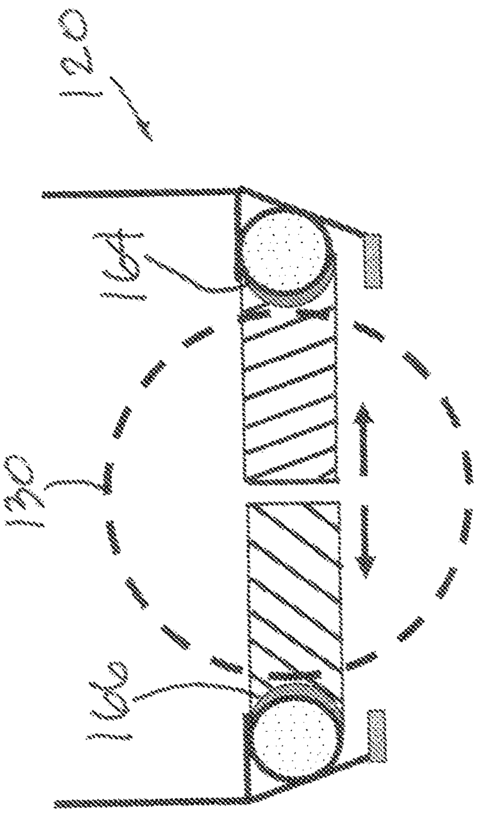

FIGS. 2A and 2B are schematic cross-sectional side views of a pickup gate device 120 in accordance with aspects of the invention is shown. FIG. 2A shows the pickup gate device 120 having a gate 148 in a closed position, in which the inside diameter of the gate is smaller than the OD of the tennis ball, and FIG. 2B shows the pickup gate device 120 having the gate 148 in an open position, in which the inside diameter of the gate opens so that the OD of the tennis ball can pass therethrough, as further discussed below.

The pickup gate device 120 may be attached to the first end 106 of the tube body 104 as shown in FIG. 1, such as by interference fit, by adhesive, by bonding, by detents, by fasteners, or combinations thereof. In an example, the pickup gate device 120 comprises a body 140 having a first end 142 and a second end 144 and a wall surface 145 defining an interior 146. Both the first end 142 and the second end 144 can be open ends and the body 140 being hollow for accepting a tennis ball 130 passing therethrough, as previously discussed. The gate 148 can be positioned within the body 140 of the pickup gate device 120. The body of the pickup gate device 120 can be made from a high durometer rubber material or a hard plastic material.

In an example, an internal shoulder 150 is provided having an inside diameter (ID). The ID of the internal shoulder 150 is preferably approximately the same size or larger than the outside diameter (OD) of the tennis ball 130, which can be approximately 2.57-in to 2.7-in. For example, the ID of the internal shoulder 150 can be about 2.6-inch to about 2.9-inch or larger. Less preferably, the ID of the internal shoulder 150 is smaller than the smallest range of the tennis ball OD. More preferably, the ID of the internal shoulder 150 is larger than the largest range of the tennis ball OD. The internal shoulder 150 provides a physical stop for the gate 148, to prevent the gate 148 from moving further into the hollow interior of the body 140 towards the second end 144. The internal shoulder 150 may be molded with the body 140. Optionally, the shoulder 150 is formed by an insert wedged inside the body 140 to form the shoulder from the body of the insert.

A securement cap or plate 156 having an ID can attach to the first end 142 of the body 140 to secure the gate 148 between the securement cap or gate 156 and the internal shoulder 150. For example, the gate 148 can be placed into the holding space 158 and then the securement cap 156 is secured to the first end 142 of the body 140, such as by detent engagement, press-fit, or threaded engagement. In an example, the ID of the securement cap 156 is approximately the same size or larger than the OD of the tennis ball 130. For example, the ID of the securement cap can be about 2.6-inch to about 2.9-inch or larger. Less preferably, the ID of the securement cap is smaller than the smallest range of the tennis ball OD. More preferably, the ID of the securement cap is larger than the largest range of the tennis ball OD. The securement cap 156 can be made from a metal material, such as from brass, steel, aluminum, or alloys thereof. Alternatively, the securement cap 156 can be made from a hard plastic material, such as polycarbonate or ABS, or a high durometer rubber material.

In an example, the height or measurement between the securement cap 156 and the internal shoulder 150 is larger than the physical height of the gate 148, in the axial direction, to allow the gate 148 to axially float within the holding space 158 of the body 140. For example, when a tennis ball 130 is pushed through the gate 148, as shown in FIG. 2B, the ball 130 pushes the gate 148 upwardly against the internal shoulder 150, as well as opening the gate in the radial direction, as further discussed below, to allow the tennis ball to pass therethrough. In other examples, the gate 148 can float a smaller amount by decreasing the gap between the internal shoulder 150 and the securement cap 156 or the gap can be selected to not permit or only minimally permit any axial floating of the gate 148. Incorporating axial floating can decrease the manufacturing tolerance requirement as well as permit the gate 148 to flex and adjust from any off-alignment.

In the example shown, the wall section 145*a* of the holding space 158 has a tapered surface, that tapers smaller in the direction of the first end 142. The taper surface is sized and shaped to contact the gate when the gate is in the closed position of FIG. 2A but widens in the direction of the second end 144 to allow the gate to open in the radial direction, as shown in FIG. 2B.

In other examples, the sidewall or wall section 145*a* at the holding space 158 is a generally straight in the axial direction, and the securement cap 156 is provided with a skirt or an extension with a taper so that when the securement cap 156 attaches to the body 140, the taper surface is provided by the securement cap. In still other examples, the sidewall or wall section 145*a* at the holding space 158 is generally straight and a gap is provided between the interior wall surface of the body 140, such as the ID at the holding space 158, and the gate 148. The gap can be provided in both the closed state and in the open state to allow the gate to expand in the radial direction when moving from a closed position (FIG. 2A) to an open position (FIG. 2B).

In an example, the gate 148 comprises a helical extension spring 164 and a push ring 166. The helical extension spring 164 can be in a spring ring configuration, wherein two ends of a spring length are joined to form a ring configuration. In an example, the spring ring is formed by welding the two ends together or by interference, looping one end into the other. The spring ring 164 is sized with a ring ID that is smaller than the diameter of a tennis ball 130. Thus, anytime a tennis ball 130 passes through the center of the gate 148, the spring ring 164 must expand to increase its ID to then permit the tennis ball to pass therethrough. The ID of the spring ring can be adjusted depending on the thickness or girth of the push ring.

In an example, the push ring 166 has an arcuate surface along an end cross-section. In particular, the push ring 166 has a concave surface that receives or accommodates the spring ring 164 and a convex opposing surface that contacts the tennis ball 130 when the pickup assembly 100 is used to pick up the tennis ball. The push ring 166 can be a split ring. In an example, the push ring 166 has two split lines 172 so that the push ring comes apart in two pieces. The push ring 166 can be formed by plastic injection molding. In alternative embodiments, the push ring, such as the push ring sections, can be made from a metal material. In still other examples, the push ring 166 can have more than two pieces or sections by incorporating more than two split lines.

If the push ring 166 is circular in shape, the push ring has a split line at the 12 o'clock position and another at the 6 o'clock position. In radial coordinates, the two split lines are generally positioned 180 degrees apart with other values contemplated. In other examples, there can be more than two split lines, such as three, four, or more, and more than two push ring sections. Although the push ring 166 is not required as the tennis ball 130 can contact the spring ring 164 directly and expand the spring ring during use, using the push ring 166 allows the tennis ball 130 to push against solid surfaces of the push ring 166 instead of the coils of the spring ring to provide more evenly distributed forces to expand the push ring 166 at the split lines to then expand the spring ring 164.

In an example, the inside diameter of the push ring 166 is smaller than the OD of the tennis ball 130. For example, if a tennis ball has an OD range of 2.57-in to 2.7-in, then the ID of the push ring 166 should be less than 2.57-in, such as being about 2.2-in to about 2.4-in. The ID of the push ring 166 can be smaller than 2.2-inch, such as 2.0-inch, provided there is sufficient room in the holding space for the spring ring 164 and the push ring 166 to expand to accommodate the tennis ball 130. The spring ring ID should be less than the ID of the push ring 166 in order to maintain a positive closing force on the push ring 166 to keep the two or more push ring sections of the push ring 166 abutting one another at the two or more split lines, as further discussed below.

In an example, the holding space 158 (FIG. 2A) of the body 140 is provided with sufficient space to allow the gate 148 to expand in the radial direction when the tennis ball 130 is pushed through the center of the push ring 166. For example, in the gate open configuration of FIG. 2B, the holding space 158 of the body 140 is provided with sufficient space to allow the push ring 166 to radially expand at the two or more split lines of the push ring to accommodate the tennis ball 130 as the tennis passes therethrough. Thus, if the tennis ball 130 has an OD of 2.7-in, then the holding space 158 should provide sufficient space to enable the push ring 166 to expand to accommodate the 2.7-in OD of the tennis ball.

In yet other examples, the push ring 166 can expand to a maximum ID that is less than the OD of the tennis ball 130. Since the tennis ball is hollow, the tennis ball can compress and still pass through the ID of the push ring 166 even if the ID of the push ring is smaller than the tennis ball OD. After the tennis ball 130 passes through the ID of the push ring 166, the spring force of the spring ring 164 forces the sections of the push ring 166 to compress back together and the different sections contact along the two or more split lines, or at least move back closer to one another. In essence, the gate 148 of the pickup gate device 120 can move from the position of FIG. 2A, expand to the position of FIG. 2B to pick up a tennis ball 130, then shrink back in size to that of FIG. 2A after the tennis ball 130 passes through the ID of the pickup or push ring 166, and then repeat when used to pick up the next tennis ball.

FIG. 3B is a top view of a gate 148 in accordance with aspects of the invention, for use with a pickup gate device 120 described elsewhere herein. The gate 148 has a push ring 166 and a spring ring (not shown in the top view). As shown, the push ring 166 has two split lines 172 defining two push ring sections 166*a*, 166*b*. The push ring has an ID and an OD. The ID is smaller in dimension than the OD of a tennis ball 130. Thus, when a tennis ball 130 is pushed through the ID of the push ring 166, as shown in FIG. 2B, the two push ring sections 166*a*, 166*b* are configured to move away from one another, as indicated by the two arrows, and the two ring sections separate at the two split lines 172. When no longer biased outwardly by the tennis ball, the spring force of the spring ring 164 biases the two push ring sections 166*a*, 166*b* back towards one another to reduce the ID of the push ring 166. Preferably when the push ring 166 is not expanded by the tennis ball, the spring ring 164 exerts a sufficient radially inwardly force to cause the two push ring sections 166*a*, 166*b* to contact at the split lines 172.

Figure 3A:
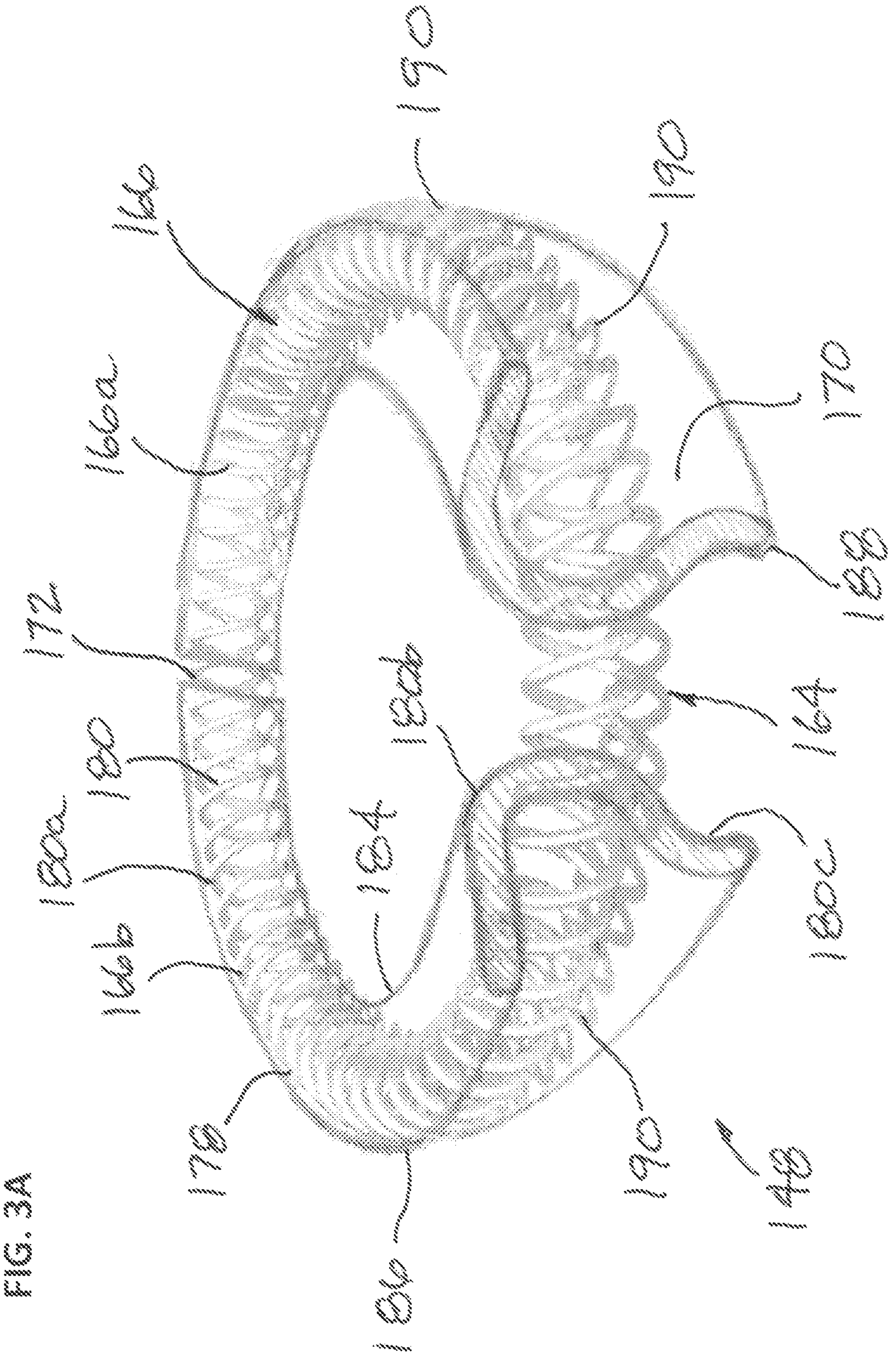
FIG. 3A is a perspective view of a gate comprising a spring ring and a push ring.

FIG. 3A is a schematic perspective view of a gate 148 provided in accordance with aspects of the present invention, which is usable with a pickup gate device 120 described elsewhere herein. The gate 148 of FIG. 3A is a three-dimensional representation of the top view of FIG. 3B. As shown, the gate 148 has a spring ring 164 held against a concave surface 170 of a push ring 166, which is shown in transparent view to show interactions between the spring ring 164 and the push ring 166. The push ring 166 has two push ring sections 166*a*, 166*b* that are shown expanded along one of the split lines 172 and partially truncated at the other split line to show the shape, or the cross-sectional end view, of each of the two push ring sections 166*a*, 166*b*. The separation at the split lines depicts a situation in which the tennis ball passes through the ID of the push ring and pushes the push ring sections away from one another.

Each push ring section 166*a*, 166*b* has an arcuate body 178 comprising a wall 180 that can be viewed as a combination of three wall sections: (a) an upper wall section 180*a*, (b) a sidewall section 180*b*, and (c) a lower wall section 180*c*. The three wall sections can form a concave section 170 and an opposing convex section 184. The inwardly-most point of the convex section 184 defines an inside diameter ID of the push ring 166. The dimension of the inside diameter can change. As previously discussed, the ID is smallest when the plurality of push ring sections 166*a*, 166*b* come together and contact along their split lines 172. The ID increases when the plurality of push ring sections 166*a*, 166*b* move away from one another, such as when a tennis ball passes through the ID of the push ring.

The upper wall section 180*a* has a free end 186 that is not bounded or connected to any other structure. The lower wall section 180*c* also has a free end 188 that is not bounded or connected to any other structure. The sidewall section 180*b* defines the inside diameter of the push ring 166. The free end 188 of the lower wall section 180*c* can define a gate opening from the first end of the pickup gate device 120. As further discussed below, the upper wall section 180*a* can be generally horizontal to completely horizontal so that after a tennis ball passes through the ID of the push ring and contacts the upper wall section 180*a*, the weight of the tennis ball or the weight of the plurality of tennis balls generated on the upper wall section 180*a* is relatively small with little to zero radial component forces to open the two push ring sections 166*a*, 166*b*. Conversely, the lower wall section 180*c* is tapered so that when the pickup assembly 100 is pushed down against a tennis ball that is sitting on the ground to collect the tennis ball within the tube 102 (FIG. 1), the downward push of the gate 148 against the tennis ball imparts component forces on the lower wall sections 180*c* to generate radial component forces to force the push ring sections to separate, thus causing the ID of the push ring 166 to increase from a first value, size or dimension to a larger second value, size or dimension.

The smaller first value of the ID is sufficiently small such that tennis ball or balls cannot pass from inside the tube 102 (FIG. 2) out through the ID of the gate 148 of the pickup gate device 120. Conversely, the larger second value of the ID is sufficiently large to allow a tennis ball to pass therethrough and into the interior 126 of the tube 102.

The spring ring 164 shown can be a helical extension spring length or compression spring length comprising a plurality of interconnected coils 190 and wherein two ends of the spring length are connected to form the spring ring configuration. The two ends can be connected by welding or using any customary means for connecting the two ends together. The spring constant, coil spacing, wire size, and metal wire material can be selected to ensure sufficient closing forces to move the plurality of push ring sections of the push ring 166 together when the pickup assembly 100 having the pickup gate device 120 is not used to pick up a tennis ball. The spring 164 can also be selected so that when the pickup assembly 100 having the pickup gate device 120 is used to push down against a tennis ball to pick up the tennis ball, the force required to expand the spring ring 166 is not excessive so that tennis players of diverse ages can use the pickup assembly 100 to pick up a tennis ball.

With reference again to FIG. 3B, the gate 148 can have a push ring 166 having different cross-sectional shapes. FIGS. 3C, 3D, and 3E show different alternative embodiments of push rings 166 taken along line A-A of FIG. 3B. As shown, the different push rings 166 have different curves, thicknesses, angles, widths, and overall heights. All three push ring embodiments have a concave side 170 and a convex side 184. Further, all three push rings have a point along the convex side 184 that defines the ID of the push ring. The different alternative gates 148 can be used in a pickup gate device 120 as described elsewhere herein.

Figure 4A:
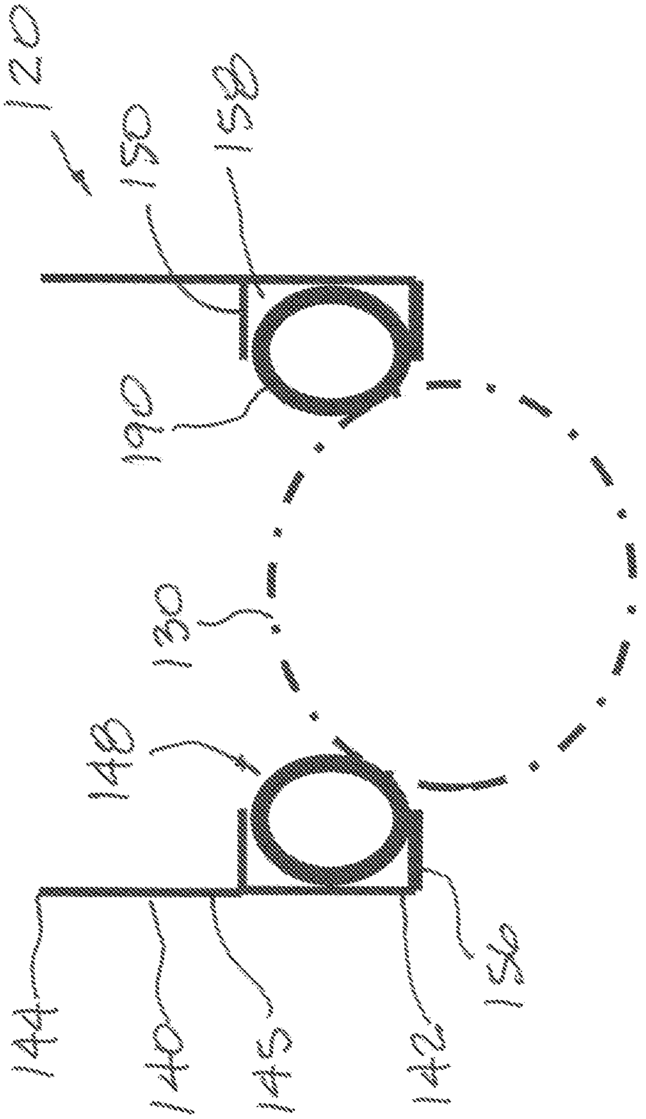
FIGS. 4A and 4B are schematic side views showing two different states of a pickup gate device in accordance with further aspects of the invention, usable at the first end of the pickup assembly of FIG. 1.
Figure 4B:
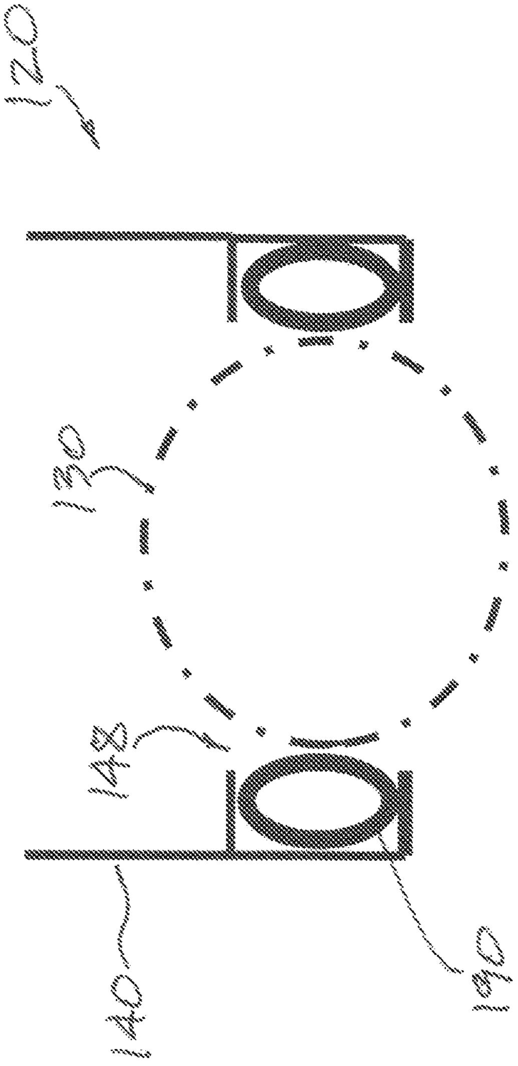

FIGS. 4A and 4B are schematic views of an alternative pickup gate device 120 provided in accordance with aspects of the invention, which is usable at a first end 106 of a tube assembly 100 (FIG. 1). As shown, the pickup gate device 120 has a spring ring 164 in which the plurality of metallic coils of the spring ring are elliptical in shape and turned or rotated so that the shorter length of the elliptical shape is generally perpendicular to the lengthwise axis of the pickup gate device. Unlike the coils of a helical extension spring, which are generally round and cannot deflect in the radial direction to the spring ring axis, the coils 190 of the present spring ring all pre-slant generally in the same direction and can deflect further in a radial direction to the spring ring axis, or radial to the axis passing through the center of the spring ring. Thus, when a tennis ball passes through the ID of the spring ring, as shown in FIG. 4B, the coils 190 deflect radially to provide clearance for the tennis ball to pass therethrough, and in essence increase in ID dimension of the spring ring. After the tennis ball passes through the spring ring ID, the coils 190 return to their more relaxed state, as shown in FIG. 4A, thereby restoring the spring ring's original ID.

Thus, unlike the embodiment of FIGS. 2A and 2B, in which a gap is provided between the spring ring OD and the inside wall surface of the body 140 to enable the spring ring to expand, the OD of the spring ring in the embodiment of FIGS. 4A and 4B contacts the inside wall surface of the body 140, or wall surface of other structures, at all times while still allowing the ID of the spring ring to change from a first state having a first dimension to a second state having a larger second dimension, by allowing the coils to deflect in the radial direction.

The gate 148 of FIGS. 4A and 4B is shown with a spring ring 164 only, without a push ring. In alternative embodiments, a push ring 166, such as shown in FIGS. 3A-3E, may be used with the spring ring shown.

Figure 5A:
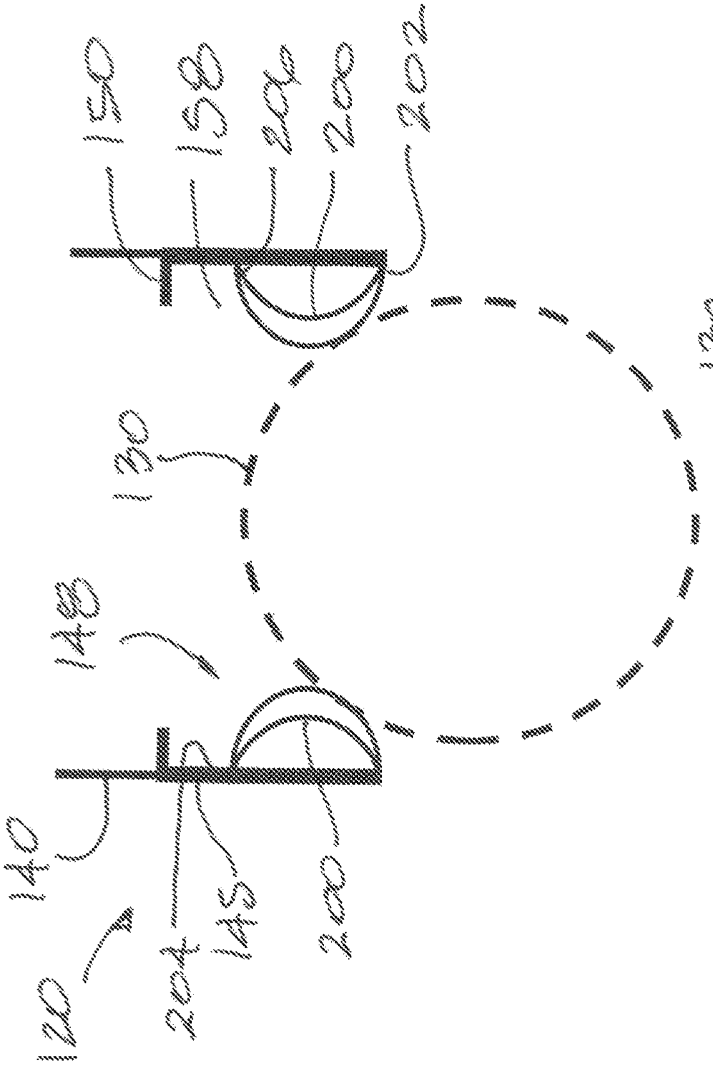
FIGS. 5A and 5B are schematic side views showing two different states of a pickup gate device in accordance with further aspects of the invention, usable at the first end of the pickup assembly of FIG. 1.
Figure 5B:
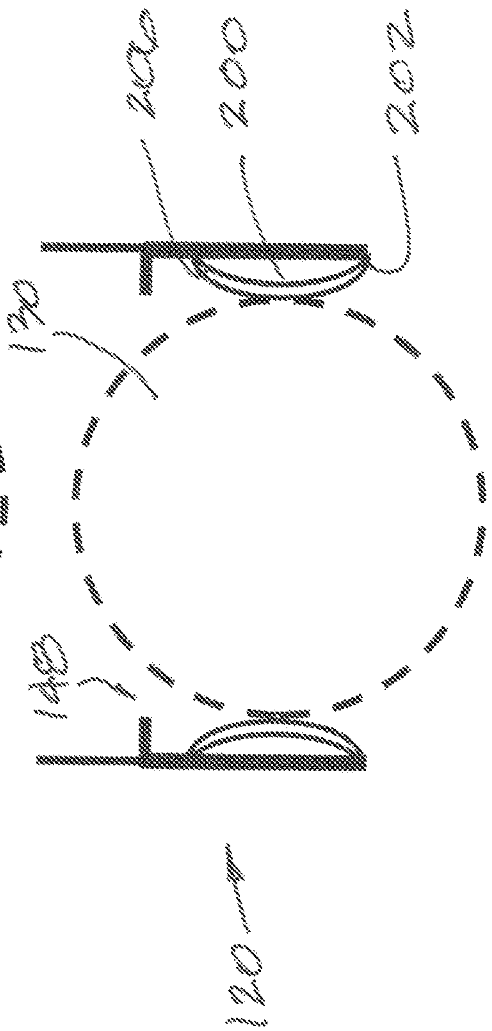

FIGS. 5A and 5B are schematic views of an alternative pickup gate device 120 provided in accordance with further aspects of the invention, which is usable at a first end 106 of a tube assembly 100 (FIG. 1). As shown, the pickup gate device 120 has a spring ring 164 made from a metal material comprising a plurality of leaf springs 200. Each leaf spring 200 has a curved spring body having a lower leg 202 that is connected to a spring sheet 204 and an upper leg 206 that is not connected to the spring sheet so that the upper leg can move or slide, as shown in FIG. 5B, when the curved spring body is compressed by the tennis ball. The plurality of leaf springs 200 can be slotted from a thin metal sheet and then cold-worked to form the curved spring bodies. The two ends of the spring sheet 204 can then be connected to form a ring shape for fitting into the holding space 158 of the pickup gate device 120. In alternative embodiments, the upper leg 206 of each leaf spring 200 can connect to the spring sheet 204 while the lower leg 202 can be free to slide or move.

The plurality of convex sides of the plurality of leaf springs 200 together define a gate ID, which is smaller in dimension that the OD of a tennis ball 130. Thus, when a tennis ball 130 passes through the ID of the spring ring, as shown in FIG. 5B, the leaf springs 200 deflect or flattened to provide clearance for the tennis ball, and in essence increase in ID dimension. After the tennis ball passes through the spring ring ID, the leaf springs 200 return to their more relaxed state, as shown in FIG. 5A.

Thus, unlike the embodiment of FIGS. 2A and 2B, in which a gap is provided between the spring ring OD and the inside wall surface of the body 140 to enable the spring ring to expand, the present spring ring OD contacts the inside wall surface of the body 140 at all times while still allowing the ID of the leaf springs 200 to change from a first state having a first dimension to a second state having a larger second dimension.

The gate 148 of FIGS. 5A and 5B is shown with a spring ring 164 only, without a push ring. In alternative embodiments, a push ring 166, such as shown in FIGS. 3A-3E, may be used with the spring ring shown.

Figure 6:
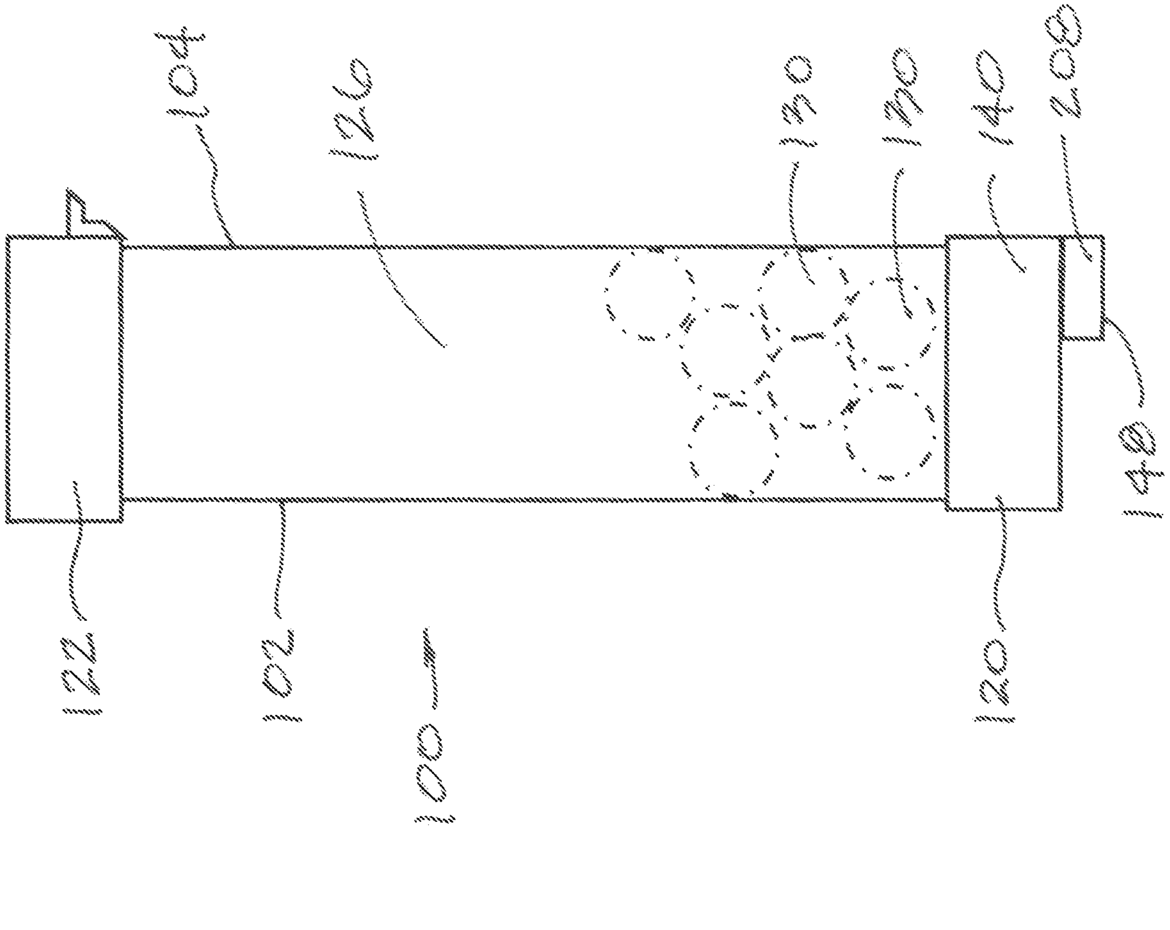
FIG. 6 is a schematic side view of tennis ball pickup assembly for large tennis ball capacity.

With reference now to FIG. 6, a schematic side view of a tennis ball pickup assembly 100 provided in accordance with further aspects of the invention is shown. The tennis ball pickup assembly 100 comprises a tube 102 having a tube body 104 with a first end and a second end. A pickup gate device 120 is shown slipped over the first end 106 of the tube body 104 and an optional support sleeve 122 is shown slipped over the second end 108 of the tube body. The present pickup assembly 100 is similar to the pickup assembly described with reference to FIGS. 1-5B with a few exceptions. In the present embodiment, the tube body 104 has a larger inside and outside diameters so that the hollow interior 126 of the tube body 104 can accommodate more than one tennis ball along a radial dimension of the tube body. For example, as shown, the tube body 104 can accommodate at least two tennis balls 130 across the horizontal or radial dimension of the tube body. It is expected that an approximate 5.5-inch to 6.0 ID tube body can stack three tennis balls across the horizontal or radial dimension of the tube body. This diameter is roughly twice the size of a traditional tennis ball tube but wherein the pickup assembly of the present embodiment can accommodate three balls across instead of one. The ability to hold or handle more tennis balls within the larger diameter tube is due in part to the unique pickup gate device having a gate of the present invention.

As shown, the pickup gate device 120 has an extended portion defining a gate housing 208 having a gate 148 located therein. The body 140 of the pickup gate device and the gate housing are open to one another. The open end of the body 140 is configured to fit over the first end of the enlarged tube 102. The gate 148 located in the gate housing 208 allows tennis balls to pass through the gate ID and into the interior 126 of the tube 102.

The gate 148 can embody any of the gates described elsewhere herein, including one with a spring ring with or without a push ring. The gate housing 208 can be located to a side, i.e., non-concentric, of the body 140 of the pickup gate device 120. In other embodiments, the gate housing 208 can be centrally located at the bottom end of the body 140. In still other examples, a second gate housing 208 having a second gate 148 can be provided with the pickup gate device 120. In still other examples, a third gate housing having a third gate can be provided with the pickup gate device, along with the first gate and the second gate. Using more than one gate in more than one gate housing can allow the user to use the pickup assembly to pick up two or more tennis balls at a time.

Because the tube body 104 of FIG. 6 is larger than a single stack tube body (FIG. 1), an optional handle can be provided between the two ends 106, 108 to assist in handling the pickup assembly. The handle can be formed with a sleeve that slides onto the tube body. Alternatively, the sleeve can be clamshell with a split line to enable placement over the tube body. In still other examples, one or more hose clamps may be used to clamp the handle to the tube body.

Figure 7:
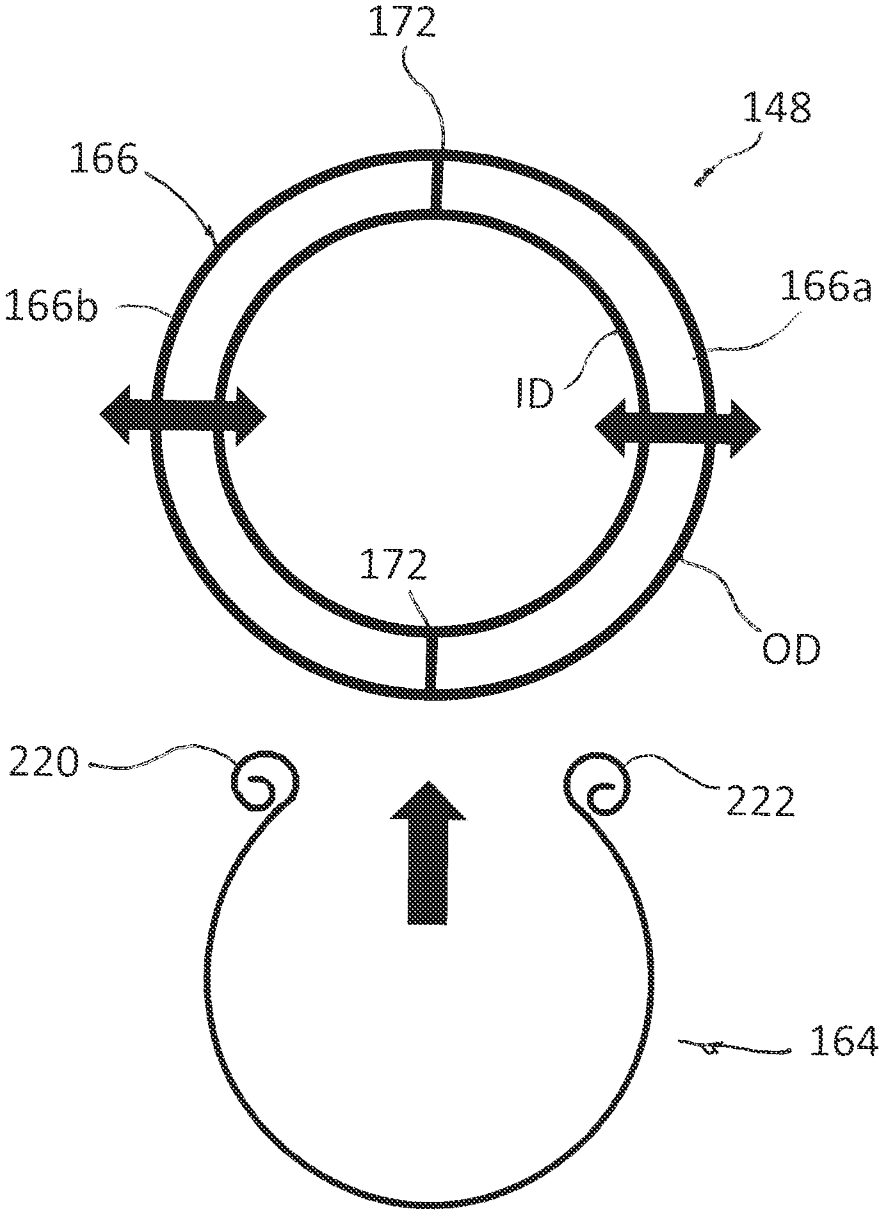
FIG. 7 is a schematic view showing an alternative gate provided in accordance with further aspects of the invention.

With reference now to FIG. 7, a top view of an alternative gate 148 provided in accordance with further aspects of the invention is shown. The gate 148 is shown with the push ring 166 spaced from the spring ring 164. The present gate 148 may be used as part of a pickup gate device 120 for use to pick up a tennis ball. The present gate 148 is similar to other gates discussed elsewhere herein with a few exceptions. In the present embodiment, the spring ring 164 is a spring clip, similar to a snap ring but wherein the ring body is made from a metal wire without interconnected coils. The type of metal material and the wire gauge can be selected to generate the desired spring force to open and close the two or more push ring sections of the push ring 166, which the present embodiment is shown with two push ring sections 166*a*, 166*b*. For example, the present spring ring 164 may be made from a stainless-steel wire or other ferrous or non-ferrous based metals. The spring clip can be non-continuous, and is shown with two spaced apart ends 220, 222 with a gap therebetween. The two spaced apart ends 220, 222 allow the spring ring to easily slide into engagement with the concave surface of the push ring 166. The two ends 220, 222 are independently movable.

In alternative embodiments, the spring ring can be a circular spring clip, similar to a key chain but wherein the two ends of the circular spring clip only minimally overlap so that the spring can readily expand and return to its relaxed state when the gate is used to pickup a tennis ball. A wire used to form a circular spring clip with two ends and the wire is curved to form a loop so that the two ends meet at the full loop is understood to represent one full loop with zero overlap. While a full loop with zero overlap can be used, preferably the circular spring clip of the alternative embodiment has some overlapping and can equal to about 1.0 to 1.2 loops, which corresponds to about a 20% overlap. The overlapped ends can be spread apart and slip into engagement with the push ring. Once in place, the ends can spring back and provide an inward bias on the push ring sections. The two ends can be independently movable.

As previously discussed with reference to FIG. 3A, the push ring 166 has a convex section defining the ID of the push ring and a concave surface or section for receiving the spring ring 164. However, because the present spring ring 164 is a spring clip formed using a single straight metal wire without interconnected coils, like an extension spring, the concave surface or section of the push ring may be modified to receive the wire of the spring ring of the present snap-ring type spring. For example, the concave surface may be provided with a channel or groove that is sized and shaped for receiving the wire of the spring ring 164.

Thus, aspects of the present embodiment are understood to include tennis ball pickup assembly comprising a pickup gate device comprising a body having a wall with a first end, a second end, and a hollow interior; and wherein a gate is located in a holding space of the hollow interior, the gate comprising a spring ring made from a metal having two free ends that overlap or spaced from one another.

Figure 8:
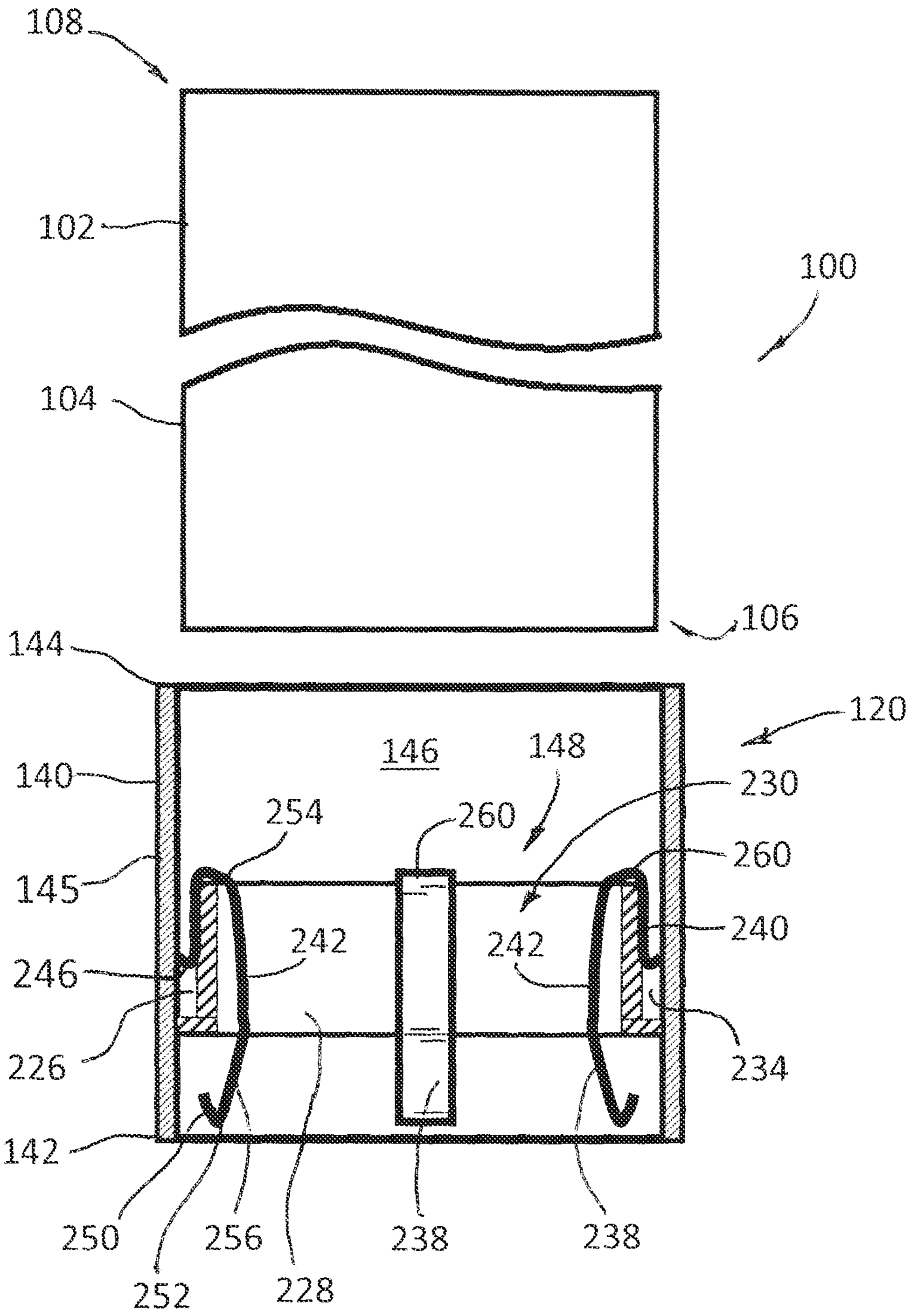
FIG. 8 is a schematic view showing an alternative pickup assembly provided in accordance with further aspects of the invention.

With reference now to FIG. 8, a schematic drawing showing an alternative tennis ball pickup assembly 100 is shown. The present assembly has a tube 102 with a tube body 104 and a pickup gate device 120. The pickup gate device 120 is configured to attach to the first end 106 of the tube, similar to the pickup assembly of FIG. 1. Although not shown, an optional support sleeve 122 (FIG. 1) may be provided at the second end 108 of the tube 102.

The pickup gate device 120 comprises a body 140 having a first end 142 and a second end 144 and a wall surface 145 defining an interior 146. Both the first end 142 and the second end 144 can be open ends and the body 140 being hollow for accepting a tennis ball 130 passing therethrough, as previously discussed. The gate 148 can be positioned within the body 140 of the pickup gate device 120. The body 140 is sized and shaped to attach to the first end 106 of the tube body 104, such as by interference fit, by adhesive, by bonding, by detents, or combinations thereof.

The gate 148 in the present embodiment comprises an internal mounting sleeve 230 attached to the body 140 of the pickup gate device 120. In an example, the mounting sleeve 230 in integrally molded with the body 140. In other examples, the mounting sleeve 230 is separately formed and subsequently attached to the interior surface of the body, such as by detent engagement, adhesive, welding, fasteners, or combinations thereof. Relative to the central axis of the body 140, the mounting sleeve 230 has an exterior surface 226 and an interior surface 228.

The mounting sleeve 230 and the body 140 define a receiving channel 234 therebetween. The receiving channel 234 can be open or continuous along 360 degrees of the interior surface of the body or can be sectioned off into discrete receiving channels, with each discrete channel configured to receive a metal clip 238. Each metal clip 238 is a flat spring, also known as a leaf spring. Each meal clip can have a first leg 240 attached to a second leg 242. The two legs 240, 242 can have different lengths. As shown, the first leg 240 is shorter than the second leg 242. The first leg 210 can have a curved lip 246 and can insert into the receiving channel 234 while the second leg 242 is located outside of the receiving channel 234. When so inserted, the curved lip 246 on the first leg 240 can abut, engage, or grip either the exterior surface 226 of the mounting sleeve 230 or the interior surface of the body 140, or both, to secure the first leg 240 within the receiving channel 234. The receiving channel 234 may optionally incorporate ribs to abut against the edges of the first leg 240 and the curved lip 246 and prevent the first leg from rocking or tilting side-to-side and from displaced from the receiving channel when the gate 148 is used to pickup tennis balls.

Three metal clips 238 are shown in the cross-sectional view of FIG. 8. In an example, there may be as few as one metal clip attached to the body. However, two or more metal clips 238 are preferred. In a particular example, four metal clips 238 are provided with the gate 148. The four metal clips can be spaced from one another, such as being equally spaced from one another. The second leg 242 of each metal clip 238 is preferably spaced from the interior surface 228 of the mounting sleeve 230 and from the interior surface of the body 240 so that the second leg 242 can deflect outwardly when the gate 148 is used to pickup tennis balls. The second leg 242 can have a curved lip 250 to form a rounded or smooth lower end 252. The smooth lower end 252 should recess from the end most edge of the first end 142 of the body 140.

The plurality of metal clips 238 define an inside diameter ID of the gate 148, which is preferably smaller than the smallest OD of a standard tennis ball, which can be approximately 2.57-in to 2.7-in. Thus, in an example, the ID defined by the plurality of metal clips is about 2.2-in to 2.4-in. The ID can be smaller than 2.2-inch, such as 2.0-inch. If only a single metal clip is used, then the ID defined by the single metal clip and the interior surface of the mounting sleeve 230 is about 2.2-in to 2.4-in, with a smaller ID contemplated.

In an example, the second leg 242 has a contour or profile that requires a lower force to deflect the second leg 242 radially outwardly, radially of the center axis of the body. The deflection can occur at the fulcrum 254, when the second leg 242 is biased by a tennis ball at the lower portion 256 of the second leg 142. Conversely, when the tennis ball, after it passes through the gate 148, is pushed against the upper portion 260 of the second leg 142, the second leg 242 does not materially deflect radially outwardly due to the short leverage provided at the upper portion. Thus, when a stack of tennis balls is collected within the tube 102 using the gate of the present embodiment, the weight of the stack of tennis balls is not sufficient to deflect the second legs radially outwardly, which if permitted can allow the collected tennis balls to escape out through the pickup gate device 120, which is undesirable. As shown, the free end of the second leg 142 projects in the direction of the opening of the pickup gate device 120. Less preferred, the configuration can be arranged so that the free of the second leg 142 projects in the direction of the second end of the tube.

The combination mounting sleeve 230 and at least one metal clip 238 can be considered a spring ring in that the mounting sleeve is generally ring shape and the at least one metal clip provides a spring force, also known as a leaf spring. Preferably, two or more metal clips 238, such as four spaced apart metal clips 238, are provided with the gate so that the spring ring is formed by the mounting sleeve 230 and the four metal clips.

Thus, aspects of the present embodiment include a tennis ball pickup assembly comprising a pickup gate device comprising a body having a wall with a first end, a second end, and a hollow interior; and wherein a gate is located in a holding space of the hollow interior, the gate comprising a spring ring a plurality of metal clips. Each metal clip can have a first leg and a second leg.

In some examples, such as shown in FIG. 1A, the first end, the second end, or both the first and second ends of any of the tennis ball pickup assemblies can be provided with an attachment adaptor or device 50. For example, the attachment adaptor 50 can be a clip, bracket, or retainer. The attachment adaptor can attach to the tube of the pickup assembly. The attachment to the tube can be direct or indirect. The attachment adaptor or device attached to the pickup assembly can then be used to grip a light source 52, such as a flashlight, so that light emitted from the light source can project through the inside or interior of the tube of the tennis ball pickup assembly and shine through the opposite end of the tube. Using the attachment adaptor and a light source can convert the ball pickup assembly to a lightsaber-like device, which can be used for decoration at a gathering. The light source 52 can illuminate the body of the tube and makes for a decorative feature. For example, during an event, a plurality of pickup assemblies each with an attachment adaptor and light source can be used to decorate the event. The tubes of the pickup assemblies, with the same or different colors, can illuminate and provide for a nice backdrop.

In an example, the attachment device can grip an edge of the pickup gate device at the first end or an edge of the support sleeve at the second end and then using a clamp-like device, which can have threads, spring biasing, Velcro, etc., to grip the light source. The attachment device can also embody a cap-like structure to snap onto the support sleeve or the pickup gate device. The cap-like structure can have an opening to accommodate the light source. The opening can be provided with a clamp-like device to secure the light source. The light end of the light source can project into an interior of the cylinder defined by the tube.

Methods of making and of using the pickup assembly 100 and components thereof, such as the pickup gate device and gate with movable components that can change from a first inside dimension to a second larger inside dimension, are within the scope of the present invention.

Although limited embodiments of a tennis ball pickup assembly and related methods and their components have been specifically described and illustrated herein, many modifications and variations will be apparent to those skilled in the art. Accordingly, it is to be understood that the assemblies and their components constructed according to principles of the disclosed device, system, and method may be embodied other than as specifically described herein. The disclosure is also defined in the following claims.

What is claimed is:

1. A tennis ball pickup assembly comprising a pickup gate device comprising a body having a wall with a first end, a second end, and a hollow interior; wherein a gate is located in a holding space of the hollow interior, the gate comprising a spring clip comprising a metal wire with two independent movable ends; and a push ring comprising at least one split line to define at least two push ring sections with each push ring section comprising a concave section in contact with the spring clip and a convex section configured to contact a tennis ball.

2. The tennis ball pickup assembly of claim 1, further comprising a tube attached to the body, and wherein an attachment device is attached to the tube and a light source is attached to the attachment device.

3. The tennis ball pickup assembly of claim 2, wherein the light source is a flashlight and wherein part of the flashlight projects an interior defined by the tube.

4. The tennis ball pickup assembly of claim 1, further comprising a tube attached to the body, and wherein the tube has an inside diameter and an outside diameter.

5. The tennis ball pickup assembly of claim 4, further comprising a gate housing extending from the body of the pickup gate device and wherein the gate housing has an outside diameter that is less than the outside diameter of the tube.

6. The tennis ball pickup assembly of claim 4, wherein the inside diameter of the tube is sized to accommodate at least two tennis balls along a plane in a radial direction.

7. The tennis ball pickup assembly of claim 1, further comprising a gate housing having an outside diameter, and a tube attached to the pickup gate device having an outside diameter larger than the outside diameter of the gate housing.

8. The tennis ball pickup assembly of claim 1, wherein the push ring has an inside diameter that is smaller than a tennis ball diameter.

9. A method of making a tennis ball pickup assembly comprising placing a gate into a holding space of a body of a pickup gate device, the body comprising a wall with a first end, a second end, and a hollow interior; and wherein the gate comprises a push ring comprising at least one split line to define at least two push ring sections with each push ring section comprising a concave section in contact with a spring and a convex section configured to contact a tennis ball.

10. The method of claim 9, further comprising attaching a tube attached to the second end of the body.

11. The method of claim 10, wherein a gate housing extends at the first end of the body and the gate is located in the gate housing.

12. The method of claim 11, wherein the gate housing has an outside diameter, and wherein an outside diameter of the tube is larger than the outside diameter of the gate housing.

13. The method of claim 9, wherein the spring comprises a plurality of interconnected coils.

14. The method of claim 9, further comprising attaching a light source to the pickup gate device.

15. The method of claim 14, further comprising turning on the light source to illuminate the tube.

16. A method of using a tennis ball pickup assembly comprising:

placing a first end of a tube over a tennis ball so that a bottom opening of a pickup gate device comprising a gate is located over the tennis ball; and pushing down on the tube so that the tennis ball pushes against a push ring comprising at least one split line to define at least two push ring sections with each push ring section comprising a concave section in contact with a spring ring and a convex section contacting the tennis ball to increase an inside diameter (ID) of the spring ring from a first inside diameter (ID) of the spring ring or the plurality of spaced apart metal clips from a first inside diameter to a second inside diameter, which is larger than the first inside diameter.

17. The method of using the tennis ball pickup assembly of claim 16, further comprising moving the tennis ball up into the tube with a second tennis ball.

18. The method of using the tennis ball pickup assembly of claim 17, further comprising filling the tube with at least two tennis balls along a same plane in a radial direction.

19. The method of using the tennis ball pickup assembly of claim 18, wherein the spring ring comprises a metal wire with two independently movable ends.

* * * * *